US012694243B2

(12) United States Patent
Hou et al.

(10) Patent No.: US 12,694,243 B2
(45) Date of Patent: Jul. 28, 2026

(54) METHODS AND SYSTEMS FOR OPTIMIZING PERFORMANCE OF AN INVENTORY SYSTEM USING MINI-CELL SITES

(71) Applicant: T-Mobile Innovations LLC, Overland Park, KS (US)

(72) Inventors: Pei Hou, Centreville, VA (US); Lyle Paczkowski, Mission Hills, KS (US); Bharatwajan Raman, Arlington, VA (US); Durga Satapathy, Ashburn, VA (US)

(73) Assignee: T-Mobile Innovations LLC, Overland Park, KS (US)

(*) Notice: Subject to any disclaimer, the term of this patent is extended or adjusted under 35 U.S.C. 154(b) by 0 days.

(21) Appl. No.: 18/923,542

(22) Filed: Oct. 22, 2024

(65) Prior Publication Data

US 2026/0111689 A1      Apr. 23, 2026

(51) Int. Cl.
*G06K 7/10* (2006.01)
*G06Q 10/087* (2023.01)

(52) U.S. Cl.
CPC ....... *G06K 7/10366* (2013.01); *G06Q 10/087* (2013.01)

(58) Field of Classification Search
CPC .......................... G06K 7/10366; G06Q 10/087
USPC ......................................................... 235/385
See application file for complete search history.

(56) References Cited

U.S. PATENT DOCUMENTS

| | | | |
|---|---|---|---|
| 2009/0195358 A1 | 8/2009 | Vennelakanti et al. | |
| 2013/0169414 A1* | 7/2013 | Bellows ............. | G06K 17/0022 340/10.1 |
| 2017/0220995 A1* | 8/2017 | Paulweber ........... | G06Q 10/087 |
| 2020/0320476 A1* | 10/2020 | Ellis ................... | G06K 17/0022 |
| 2022/0108092 A1 | 4/2022 | Wan et al. | |
| 2023/0177455 A1* | 6/2023 | Bellows ............... | B65G 1/0457 705/28 |

FOREIGN PATENT DOCUMENTS

| | | |
|---|---|---|
| WO | 2008010884 A2 | 1/2008 |
| WO | 2026089867 A1 | 4/2026 |

OTHER PUBLICATIONS

Foreign Communication From a Related Counterpart Application, Invitation to Pay Additional Fees dated Feb. 6, 2026, International Application No. PCT/US2025/048546.
Foreign Communication From a Related Counterpart Application, International Search Report and Written Opinion dated Mar. 27, 2026, International Application No. PCT/US2025/048546.

\* cited by examiner

*Primary Examiner* — Ahshik Kim

(57) ABSTRACT

An inventory system comprises one or more mini-cell sites, one or more reader devices to read tags, and a control system. The mini-cell site comprises radio equipment configured to broadcast power signals within an inventory environment. The control system transmits a first instruction to the mini-cell site to set a configuration parameter at the mini-cell site to a first frequency channel based on mini-cell site capability data and inventory environment data, and transmits a second instruction to the reader device to set a network setting at the reader device to a second frequency channel based on reader device capability data and the inventory environment data. The first frequency channel is different from the second frequency channel.

20 Claims, 7 Drawing Sheets

500

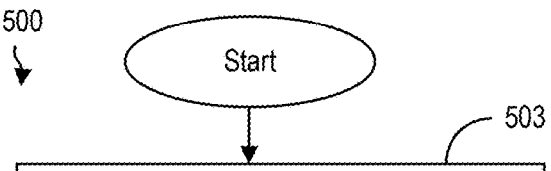

Start

503

Maintaining, in a data store of a controller system in the inventory system, inventory environment data and tag data, wherein the inventory environment data includes data describing a position of the one more mini-cell sites and one or more reader devices in the inventory environment, and wherein the tag data includes a tag identifier of one or more tags

505

Receiving, by a management application at the controller system from a client application executing at a client, a request to identify and locate the one or more tags in the inventory environment that are associated with the tag identifier

507

Determining, by the management application, a setting for the one or more reader devices in the inventory environment based on the request, wherein the setting configures the one or more reader devices to only receive response data from the one or more tags in the inventory environment that are associated with the tag identifier

509

Transmitting, by the management application to the one or more reader devices, an instruction to set the setting at the one or more reader devices to transmit interrogation signals including the tag identifier over a frequency channel to only receive response data from the one or more tags in the inventory environment that are associated with the tag identifier

511

Receiving, by the management application, the response data from the one or more tags that are associated with the tag identifier End

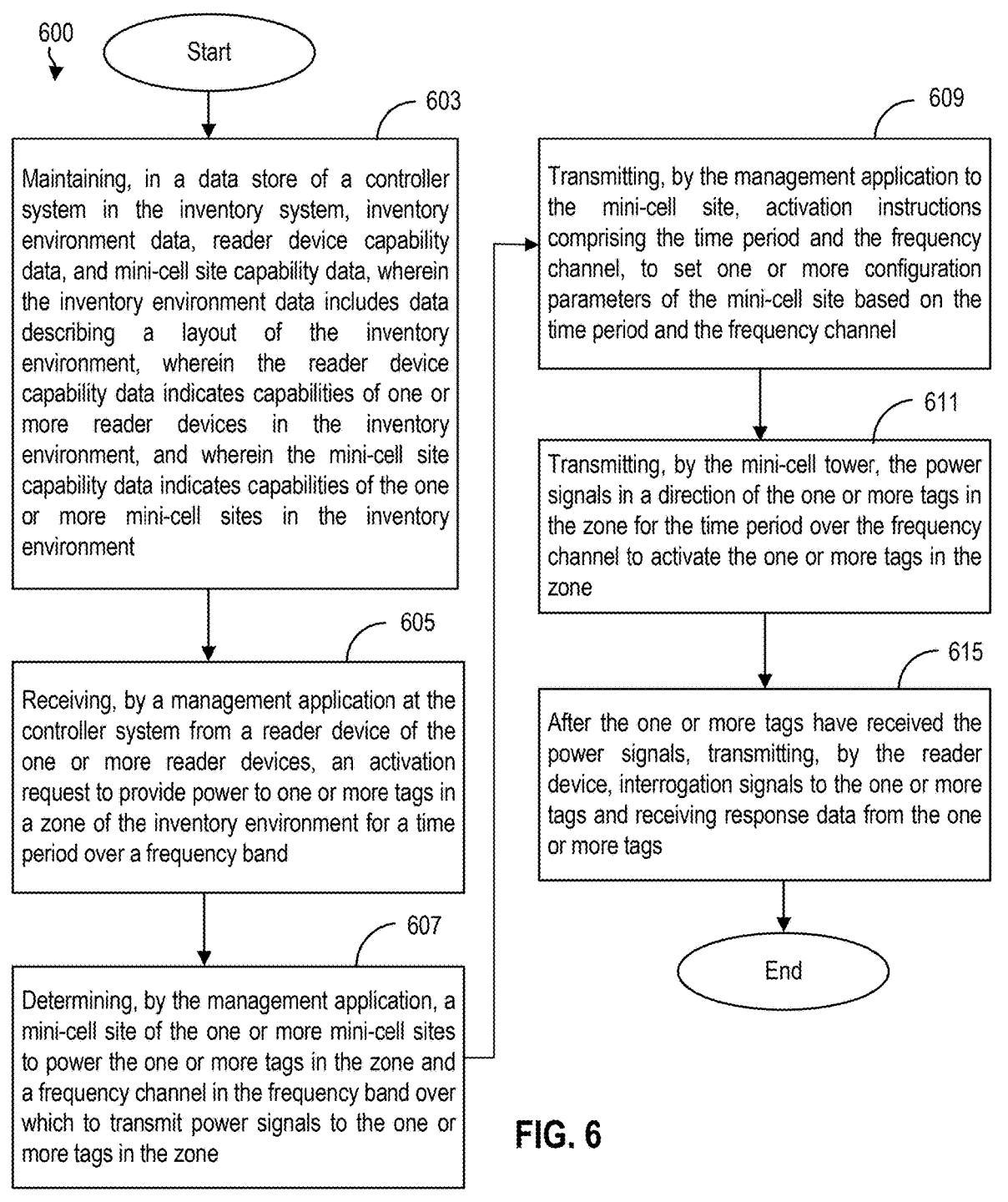

Start

603

Maintaining, in a data store of a controller system in the inventory system, inventory environment data, reader device capability data, and mini-cell site capability data, wherein the inventory environment data includes data describing a layout of the inventory environment, wherein the reader device capability data indicates capabilities of one or more reader devices in the inventory environment, and wherein the mini-cell site capability data indicates capabilities of the one or more mini-cell sites in the inventory environment

605

Receiving, by a management application at the controller system from a reader device of the one or more reader devices, an activation request to provide power to one or more tags in a zone of the inventory environment for a time period over a frequency band

607

Determining, by the management application, a mini-cell site of the one or more mini-cell sites to power the one or more tags in the zone and a frequency channel in the frequency band over which to transmit power signals to the one or more tags in the zone

609

Transmitting, by the management application to the mini-cell site, activation instructions comprising the time period and the frequency channel, to set one or more configuration parameters of the mini-cell site based on the time period and the frequency channel

611

Transmitting, by the mini-cell tower, the power signals in a direction of the one or more tags in the zone for the time period over the frequency channel to activate the one or more tags in the zone

615

After the one or more tags have received the power signals, transmitting, by the reader device, interrogation signals to the one or more tags and receiving response data from the one or more tags End

FIG. 6

METHODS AND SYSTEMS FOR OPTIMIZING PERFORMANCE OF AN INVENTORY SYSTEM USING MINI-CELL SITES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern inventory environments (e.g., warehouses and retail stores) may store items on behalf of various customers/business enterprises. Each item may be coupled to a tag, such as a Radio Frequency Identification (RFID) tag. Antenna systems and/or reader devices may be positioned throughout the inventory environment. Often, an inventory environment may include more antennas than reader devices. For example, fixed antenna systems may (with one or more antennas) be deployed throughout various areas within the inventory environment, and reader devices (fixed or mobile) may read data (e.g., backscattered energy) from the tags using signals sent by the antenna systems to the tags.

SUMMARY

In an embodiment, a method for optimizing performance of an inventory system using one or more mini-cell sites positioned throughout an inventory environment is disclosed. The method comprises maintaining, in a data store of a controller system in the inventory system, inventory environment data, reader device capability data, and mini-cell site capability data, in which the inventory environment data includes data describing a layout of the inventory environment, the reader device capability data indicates capabilities of one or more reader devices in the inventory environment, and the mini-cell site capability data indicates capabilities of the one or more mini-cell sites in the inventory environment. The method further comprises receiving, by a management application at the controller system from a reader device of the one or more reader devices, an activation request to provide power to one or more tags in a zone of the inventory environment for a time period over a frequency band, determining, by the management application, a mini-cell site of the one or more mini-cell sites to power the one or more tags in the zone and a frequency channel in the frequency band over which to transmit power signals to the one or more tags in the zone, and transmitting, by the management application to the mini-cell site, activation instructions comprising the time period and the frequency channel, to set one or more configuration parameters of the mini-cell site based on the time period and the frequency channel. The method further comprises transmitting, by the mini-cell site, the power signals in a direction of the one or more tags in the zone for the time period over the frequency channel to activate the one or more tags in the zone, and after the one or more tags have received the power signals, transmitting, by the reader device, interrogation signals to the one or more tags and receiving response data from the one or more tags.

In another embodiment, a method implemented in an inventory environment is disclosed. The method comprises maintaining, in a data store of a controller system in the inventory system, inventory environment data and tag data, in which the inventory environment data includes data describing a position of the one more mini-cell sites and one or more reader devices in the inventory environment, and the tag data includes a tag identifier of one or more tags, receiving, by a management application at the controller system from a client application executing at a client, a request to identify and locate the one or more tags in the inventory environment that are associated with the tag identifier, and determining, by the management application, a setting for the one or more reader devices in the inventory environment based on the request, wherein the setting configures the one or more reader devices to only receive response data from the one or more tags in the inventory environment that are associated with the tag identifier. The method further comprises transmitting, by the management application to the one or more reader devices, an instruction to set the setting at the one or more reader devices to transmit interrogation signals including the tag identifier over a frequency channel to only receive response data from the one or more tags in the inventory environment that are associated with the tag identifier, and receiving, by the management application, the response data from the one or more tags that are associated with the tag identifier.

In yet another embodiment, an inventory system is disclosed. The inventory system comprises a mini-cell site, a reader device, and a control system. The mini-cell site comprises radio equipment configured to broadcast power signals within an inventory environment. The reader device is configured to communicate with one or more tags in the inventory environment. The control system comprises a memory configured to store mini-cell site capability data, reader device capability data, and inventory environment data, and a management application stored at the memory, which when executed by a processor, causes the management application to be configured to transmit a first instruction to the mini-cell site to set a configuration parameter at the mini-cell site to a first frequency channel based on the mini-cell site capability data and the inventory environment data, and transmit a second instruction to the reader device to set a network setting at the reader device to a second frequency channel based on the reader device capability data and the inventory environment data, wherein the first frequency channel is different from the second frequency channel.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is a flowchart illustrating a first method of optimizing the inventory system of FIG. 1 using the mini-cell sites according to various embodiments of the disclosure.

FIG. 6 is a flowchart illustrating a second method of optimizing the inventory system of FIG. 1 using the mini-cell sites according to various embodiments of the disclosure.

DETAILED DESCRIPTION

Figure 1:
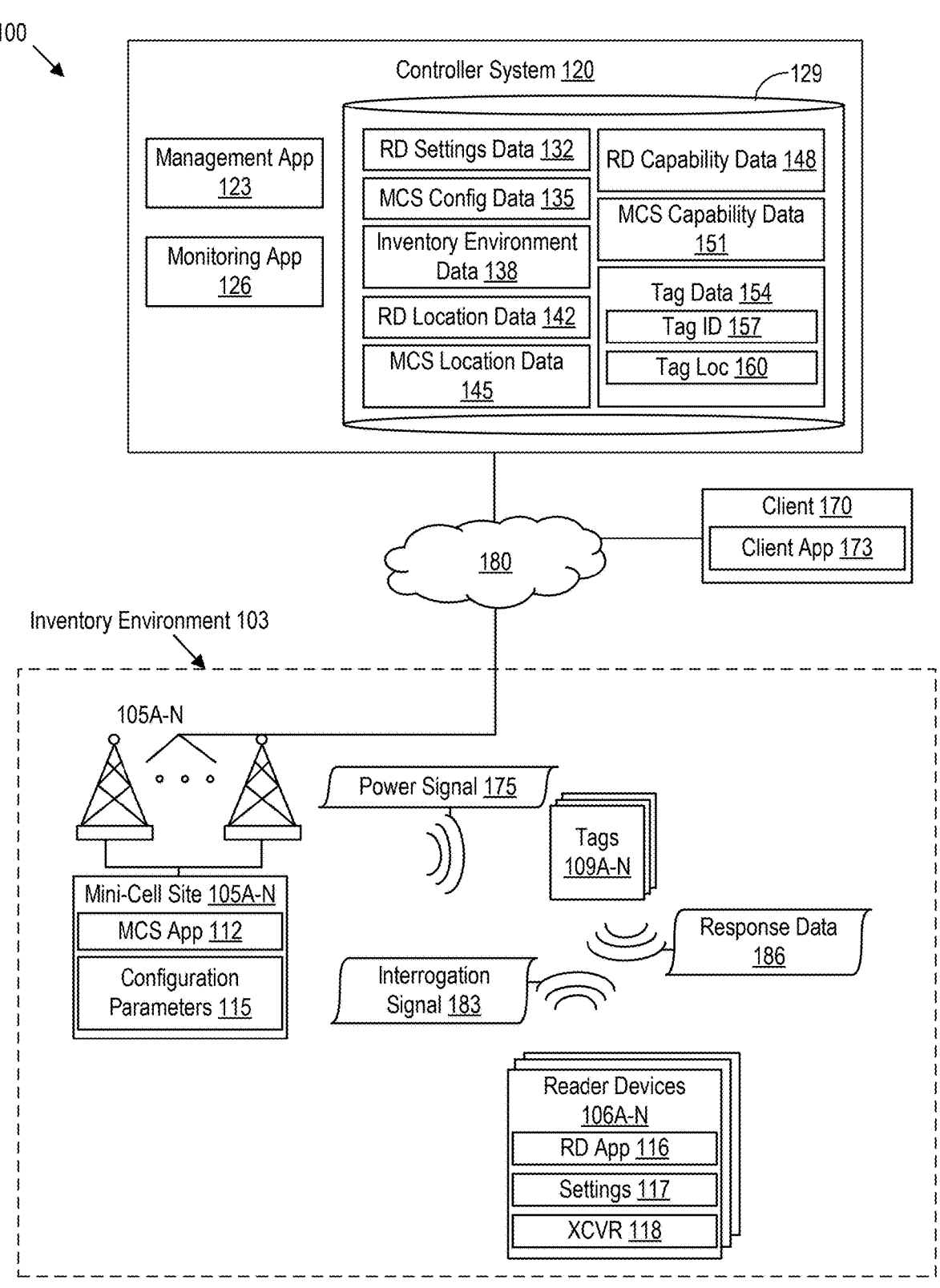
FIG. 1 is a block diagram of a communication network including an inventory system with one or more reader devices, mini-cell sites, and tags according to various embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, an RFID tag (sometimes referred to herein as simply a "tag") is a small electronic device that stores data and communicates with antennas and reader devices via radio waves for identification and tracking purposes. Tags may be attached to different types of items, which may enter, pass through, be stored at, or exit different inventory environments. An inventory environment may refer to a location in which items may be stored or located at least temporarily. An inventory environment may be, for example, a warehouse or a retail store. An operator of the inventory environment may deploy antennas and/or reader devices at various positions throughout the inventory environment, in a mobile or stationary manner.

Antennas may operate to emit signals (e.g., radio frequency signals) into a region including the items with the tags. The tags within the range of the emitted interrogation signals may receive the signals and harvest energy from the signals, which may be used to power up a passive RFID without a power source. Once the tags have obtained enough power, the tags may send response data including various types of data associated with the tag and/or an item coupled to the tag to a reader device. The reader device may receive the response data from the tags, process the response data to extract the different types of data, and transmit the data to a system external to the inventory environment.

The antennas may be separate from the reader devices, or the antennas may be integrated into the reader devices (e.g., such that the reader device includes the antenna that sends the signals to the tags to activate the tags and receives the response data from the tags). In this way, the reader devices and antennas may be intricate computer systems or devices, that are structured and loaded to ensure that all the tags within the inventory environment may be adequately powered-up and read.

However, there are several limitations related to the providing of power to the tags using the aforementioned antenna/reader device system. For example, since tags rely on the electromagnetic field generated by the antenna to power up and respond, the effective range of this power may be limited. Tags may have a read range of up to, for example, 10-15 meters under ideal conditions, and beyond this range, the signal may not be strong enough to power the tags effectively. The area in which the tags may be powered and read reliably is sometimes referred to as the "read zone," and the proper placement of antennas within the read zones may have to be thoroughly evaluated at deployment to ensure that tags within the intended coverage area receive sufficient power. Moreover, the orientation of the tag relative to the antenna affects the amount of power the tag can receive. The tags that are too far or have improper orientation toward the antennas may not receive sufficient power to work properly. Therefore, tags may have to be specifically oriented and positioned in a way to maximize exposure to the radio frequency field of the antenna for optimal performance.

Therefore, providing power to the tags using the aforementioned antenna/reader device system may be largely inefficient due to the specific distance, location, and orientation requirements of the antennas that provide power to the tags. Said another way, the tags in an inventory environment may only be read properly when there are a sufficient number of antennas placed at exact locations and orientations within different read zones of the inventory environment. In this way, when an antenna is not in the optimal location and orientation relative to the tags, the tags may not be powered properly, and thus may not transmit response data back to the reader devices. This may be especially problematic for mobile tags that are mobile within the inventory environment (e.g., tags that may move along conveyor belts, moving to different areas within the inventory environment, etc.).

The present disclosure addresses the foregoing technical problems by providing a technical solution in the technical field of inventory tracking, control, and management, by introducing one or more mini-cell sites into the inventory environment, to provide adequate power to the tags, regardless of the location and orientation of the available antennas in the inventory environment. The mini-cell sites may refer to a small-scale computer system (e.g., including communications hardware and software components) that enhances radio coverage and capacity within the inventory environment. The mini-cell sites emit radio frequency (RF) signals (also referred to herein as "power signals") within the inventory environment over a predefined frequency (either in a predefined manner, upon request, or in a programmatic manner, as further described herein). The power signals emitted from the mini-cell sites may be received by the tags, and the tags may obtain power from the power signals. Lighter-weight reader devices may be used to send interrogation signals with only modulated data signals to the tags (i.e., since the interrogation signals from the reader devices no longer need to be used alone for powering the tag). The lighter-weight reader devices may also transmit interrogation signals over longer distances since the reader devices are not alone responsible for sending power signals to the tags, thereby increasing the read zone of the tags. In this way, the embodiments disclosed herein enable tags to obtain power from signals received from the mini-cell sites, as opposed to specifically positioned/oriented antennas, enabling the tags to the send response data back to lighter-weight reader devices (as opposed to complex integrated reader devices). The inventory environment may also not need to include as many antennas or complex antenna systems, and the reader devices may not need to be complex integrated devices with antennas. Instead, the mini-cell sites may provide the necessary power to the tags, thereby minimizing the complexity of and quantity of devices/ antennas in the inventory environment.

The embodiments disclosed herein are directed to an inventory system positioned at least partially within an inventory environment. The inventory system may include the tags, reader devices, mini-cell sites, and a controller system (the controller system may be internal or external to the inventory environment). The mini-cell sites may be off-the-shelf solutions that function similar to miniaturized versions of base stations or cell sites in a communication network. For example, the mini-cell sites may be one or more of a picocell, a femtocell, a distributed antenna system (DAS) node, or any other type of communication device that may function similar to a telecommunications base station.

The mini-cell sites may emit radio frequency signals (e.g., electromagnetic waves) (again, also referred to herein as "power signals") either in a particular direction or omni-directionally, and over a predefined frequency, based on various embodiments, as further disclosed herein. The power signals are transmitted to one or more tags within a coverage area of the mini-cell site. The tags harvest energy from the electromagnetic field generated by the power signals received from the mini-cell sites. This harvested energy may power the circuitry of the tag, allowing the tag the ability to modulate and reflect a signal (also referred to herein as a "response data") back to a reader device.

The controller system may be responsible for managing, monitoring, and controlling the operation of the mini-cell sites and/or reader devices of the inventory system. The controller system may include a management application and a data store for storing various types of data used to manage, monitor, and control the operation of the mini-cell sites and/or reader devices of the inventory system. The data stored at the data store may include, for example, inventory environment data, reader device capability data, mini-cell site capability data, reader device settings data, mini-cell site configuration data, tag data, etc. For example, the inventory environment data may include data describing a layout of the inventory environment (e.g., different areas/regions in the inventory environment, locations of the reader devices and/or mini-cell sites, obstacles within the inventory environment, etc.). The mini-cell site capability data may indicate the frequency band capabilities, security capabilities, and/or other capabilities of the mini-cell sites positioned in the inventory environment. The reader device capability data may indicate the frequency band capabilities, security capability, hardware resources, software modules, and/or other parameters/capabilities of the reader devices positioned within or associated with the inventory environment. The reader device settings data may include, for example, the network settings (e.g., frequency channel settings) associated with a performance of the reader devices, while the mini-cell site configuration data may include the configuration parameters governing an attribute (e.g., frequency channel configuration) related to radio equipment of the mini-cell sites.

The management application may control the reader device settings at the reader devices in the inventory environment and mini-cell site configurations at the mini-cell sites in the inventory environment based on predefined parameters (e.g., set by an operator of the controller system), or based on requests received from the operator, reader devices, or clients. In a first embodiment, when the mini-cell sites and reader devices are configured based on predefined parameters, the management application may determine different frequencies over which the reader devices and mini-cell sites operate, to prevent or reduce interference between the two communication channels (e.g., the channel between the mini-cell sites and the tags for power signals, and the channel between the reader devices and the tags for the interrogation signals and the response data).

In an embodiment, the management application may determine a first frequency channel for communications between the mini-cell sites and the tags and a second frequency channel for communications between the reader devices and the tags. For example, the first frequency channel and the second frequency channel may be within a particular frequency band (e.g., 800 MHz frequency band, 600 MHz frequency band, and/or the 2 GHz frequency band). In this way, both the first frequency channel and the second frequency channel may be within a frequency band of a licensed spectrum associated with a telecommunications service provider network of the mini-cell site. The management application may determine the first frequency channel and the second frequency channel, for example, based on a request from an operator indicating the frequency band, or based on a request specifically indicating the first frequency channel and the second frequency channel.

The management application may also determine a predefined schedule over which the mini-cell sites communicate over the first frequency channel and/or the reader devices communicate over the second frequency channel. The management application may determine the schedule for communications based on a request received from an operator, in which the request indicates the schedule for communications. For example, the schedule may instruct the mini-cell sites to continuously emit power signals into an area of the inventory environment, or to emit power signals into the area for 10 seconds every minute.

In another embodiment, the management application may control the communications between the two communication channels based on a request received from a reader device in the inventory system. For example, suppose a user of a reader device intends to read a tag within an area of the inventory environment, but the mini-cell site associated with powering that area is not currently emitting power signals in the direction of the zone (e.g., the mini-cell site may be turned off, in standby mode, or emitting power signals in a different direction). The reader device may transmit an activation request to the management application at the controller system (e.g., via the cellular radio connection provided by a mini-cell site). The activation request may be a request to provide power to the area in the inventory environment. The activation request may, in some cases, indicate the frequency band/channel over which to transmit power signals to activate the tags in the area, and/or may indicate an amount of time over which to transmit the power signals to the area. The activation request may include an identification or location of the area to activate, the frequency channel, and/or the requested amount of time.

The management application may receive the activation request from a reader device. The management application may then determine the mini-cell site in the inventory environment to power the tags in the area, for example, based on a location of the mini-cell sites as indicated in the inventory environment data maintained at the data store, the location of the area as indicated in the inventory environment data, and the mini-cell site capability data of the different mini-cell sites. For example, the management application may identify the mini-cell site as one that is the closest mini-cell site to the area that is capable of emitting power signals over the requested frequency band/channel for the requested amount of time.

The management application may then transmit activation instructions to the identified mini-cell site. The activation instructions may include the identification or location of the area, the requested frequency band/channel, and/or the requested amount of time indicated in the activation request. The mini-cell site may programmatically set or adjust configuration parameters based on the code, logic, or conditions included in the activation instructions to begin emitting power signals to the requested area over the requested frequency band/channel for the requested amount of time.

After the mini-cell site has transmitted the power signals to the area, the tags in the area may harvest energy from the received power signals, and be in a ready state to transmit response data back to requesting reader devices upon receiving interrogation from a reader device. The management application may transmit a notification to the requesting reader device once the activation instructions are sent to the mini-cell site, to indicate that the tags in the area may be powered within a predefined period of time.

The reader device may then send interrogation signals to one or more tags in the area. The interrogation signal may be a modulated signal that carries encoded information, requesting the tag to transmit response data back to the reader device. The response data may include, for example, various identifiers programmed with the tag, data identifying an owner of the tag or item coupled to the tag, data describing attributes of the item coupled to the tag, etc. This interrogation signal may not include the power signal (e.g., continuous wave carrier signal) that would have otherwise been used to carry radio frequency energy as power to the tags. Instead, the interrogation signal may only include the data signal or modulated signal, and as such, the interrogation signal transmitted by the reader devices disclosed herein may have a longer range (e.g., may be transmitted over longer distances). Once the tags are powered up through the power signals from the mini-cell site and receive the interrogation signal, the tags may backscatter the response data back to the reader device.

In another embodiment, the management application may control the communications between the two communication channels based on a request received from a client (e.g., device that is not part of the inventory system), which may be used by the operator of the inventory system or another user. For example, the request from the client may be to locate a missing item that is coupled to a tag previously identified as being within the inventory environment. In this case, the client may transmit a request including an identifier provisioned on the tag of the missing item to the management application (e.g., the client may access to pre-stored records indicating mappings between items and tags, and the data provisioned on each of the tags including the identifiers associated with the tag). In some cases, the requested identifier may be unique to a single tag, or the identifier may be associated with a category of items and thus, may be provisioned on multiple tags coupled to the items in the category.

The management application may transmit an instruction to adjust a setting at one or more reader devices in the inventory environment based on the requested identifier. The setting, when programmatically set at the reader devices based on the instructions, may instruct the reader devices to only read data from one or more tags in the inventory environment that include the requested identifier. For example, the instructions may program the reader devices to transmit interrogation signals including the requested identifier, such that only the tags provisioned with the requested identifier send response data back to the reader device. In this way, when the reader device receives response data from tags, the response data may be known to be associated with the requested identifier. The reader devices may, in some cases, transmit the response data back to the management application, and the management application may transmit the response data back to the client, to facilitate in identifying the missing item.

As another example, the request received from the client may be to generally reduce energy usage in the inventory environment (by controlling the different systems/devices in the inventory environment). In this case, the client may transmit a request to the management application with a schedule to perform power cycling (e.g., turn on and turn off according to the schedule) at one or more mini-cell sites in the inventory environment. The management application may identify the mini-cell sites to power cycle, and transmit instructions to the identified mini-cell sites to perform power cycling according to the requested schedule. The mini-cell sites may then programmatically be configured to perform power cycling at the times indicated in the schedule.

Accordingly, the embodiments disclosed herein introduce mini-cell sites into the inventory environment and a controller system to control different communication channels in the inventory environment (by reducing the need to rely on complicated antenna systems and a large number of antennas in the inventory environment). The controller system may control the communications between the mini-cell sites, reader devices, and the tags in the inventory environment based on a predefined manner, based on one or more requests, or in a programmatic manner. The communications in the inventory environment may be performed over different frequency channels to prevent interference and noise between the channels, and may be used programmatically for various purposes (e.g., identifying lost items, reducing energy usage, etc.). Since the inclusion of mini-cell sites in the inventory environment reduces the load on the reader devices, the reader devices capable of communicating with tags may be lighter-weight devices that may be able to communicate over longer distances. Therefore, the embodiments disclosed herein increase resource efficiency within the inventory system while increasing overall network capacity.

Turning now to FIG. 1, a communication network 100 is described. The communication network 100 includes an inventory environment 103, a controller system 120, a client 170, and a network 180. The inventory environment 103 includes one or more mini-cell sites 105A-N, one or more reader devices 106A-N, and one or more tags 109A-N. The network 180 may be one or more private networks, one or more public networks, or a combination thereof. While the controller system 120 is shown in FIG. 1 as being separate from network 180, in some embodiments, it should be appreciated that the controller system 120 may be part of the network 180.

A client 170 may be a computer system operated by a user accessing an inventory system including the controller system 120, the mini-cell sites 105A-N, and the reader devices 106A-N. The client 170 may include a client application 173, which may include instructions stored on a memory of the client 170 that is executable by a processor of the client 170, to communicate with the controller system 120, as further disclosed herein.

The one or more mini-cell sites 105A-N may be small scale computer systems or communication devices that may be used to not only enhance cellular coverage and capacity within the inventory environment 103, but also to emit radio frequency signals into an area of the inventory environment 103. The mini-cell sites 105A-N may also provide a wireless communication link to reader devices 106A-N according to a 5G, a long term evolution (LTE), a code division multiple access (CDMA), or a global system for mobile communications (GSM) wireless telecommunication protocol. The mini-cell sites 105A-N may include less equipment or more compact versions of the equipment included in a standard macro-base station, such that the mini-cell sites 105A-N are lightweight compared to standard macro-base stations. For example, the mini-cell sites 105A-N may be one or more of a picocell, a femtocell, a DAS node, or any other type of communication device or computer system that may emit radio frequency signals into an area of the inventory environment 103.

When a mini-cell site 105A-N is embodied as a femtocell, the mini-cell site 105A-N may be a small, low-power cellular base station, sometimes used to extend cellular coverage indoors or in small areas by connecting to a core network of a telecommunications service provider network. When a mini-cell site 105A-N is embodied as a picocell, the mini-cell site 105A-N may be slightly larger than femtocells and may be used to extend cellular coverage in medium-sized areas by similarly connecting to a core network of a telecommunications service provider network. When a mini-cell site 105A-N is embodied as a DAS node, the mini-cell site 105A-N may be a node in a network of spatially separated antenna nodes connected to a common source that provides wireless service within an area. DAS nodes distribute signals throughout the area, ensuring consistent coverage and capacity. Different mini-cell sites 105A-N in the inventory environment 103 may be embodied differently (e.g., some of the mini-cell sites 105A-N may be femtocells, some of the mini-cell sites 105A-N may be picocells, etc.). As should be appreciated, the mini-cell sites 105A-N may be embodied as any other type of communication device that may be positioned within an inventory environment 103 and that is configured to extend radio coverage within an area.

The mini-cell site 105A-N may be positioned in different locations within the inventory environment 103. Each mini-cell site 105A-N may include an application 112 and configuration parameters 115. The configuration parameters 115 may be adjustable settings or configurations related to, for example, network selection, power levels, frequency allocation, and access control, that optimize performance, coverage, and security of the mini-cell sites 105A-N within the inventory environment 103. For example, the mini-cell sites 105A-N may include radio equipment for broadcasting power signals 175 (and other signals) within the inventory environment 103 and/or over the network 180, and the configuration parameter 115 may govern an attribute related to the radio equipment of the mini-cell sites 105 (e.g., a frequency band or channel at which the mini-cell site 105A-N operates). The application 112 may communicate with the controller system 120 and may adjust the configuration parameters 115 at the mini-cell site 105A-N based on instructions received from the controller system 120. The mini-cell sites 105A-N may emit power signals 175 (e.g., radio frequency signals) within the inventory environment 103 based on instructions received from the controller system 120.

The reader devices 106A-N may be electronic devices or computing systems configured to transmit interrogation signals 183 to the tags 109A-N and receive response data 186 back from the tags 109A-N coupled to the items. Each of the reader devices 106A-N include an application 116, settings 117, and a radio transceiver 118 (shown as "XCVR 118" in FIG. 1). The application 116 may communicate with the controller system 120 to adjust settings 117 of the reader device 106A-N, transmit interrogation signals 183 to the tags 109A-N, and receive response data 186 from the tags 109A-N.

The settings 117 of the reader devices 106A-N may include, for example, a power output of a signal emitted by the reader device 106A-N, a frequency band or channel at which the reader device 106A-N operates, or a receiver sensitivity of the reader device 106A-N. The settings 117 of the reader devices 106A-N may also include a type of the signals, the position of the reader device 106A-N (e.g., via a robotic arm), directional settings, or any other type of reader device setting. The radio transceiver 118 may be radio equipment used to communicate with the controller system 120 and the tags 109A-N.

The controller system 120 may be a device, UE, computer, or computer system, with various types of resources that may be interworked to control the operations of the mini-cell site 105A-N and the reader devices 106A-N. The controller system 120 may include a processor, a memory, a radio transceiver, and other hardware or software components depending on the type of computer system running the controller system 120. The controller system 120 may include a management application 123 and a monitoring application 126, both of which may be instructions stored on a memory of the controller system 120 and executable by a processor of the controller system 120. The management application 123 may receive requests from clients 170 and/or reader devices 106A-N, and transmit instructions to the mini-cell sites 105A-N and/or reader devices 106A-N based on the requests. The monitoring application 126 may monitor the performance of the mini-cell sites 105A-N and reader devices 106A-N during reading of tags 109A-N and performing other maintenance/optimization tasks in the inventory environment 103 for verification purposes.

The controller system 120 may also include a data store 129 (e.g., one or more memories, distributed or co-located). The data store 129 may store various types of data that may be used by the management application 123 and/or the monitoring application 126 to manage and monitor the performance of the mini-cell sites 105A-N and the reader devices 106A-N. As shown in FIG. 1, the data store 129 may include reader device settings data 132, mini-cell site configuration data 135, inventory environment data 138, reader device location data 142, mini-cell site location data 145, reader device capability data 148, mini-cell site capability data 151, and tag data 154. The reader device settings data 132 may include data describing current and prior settings 117 of the reader devices 106A-N that are currently in or have previously been in the inventory environment 103. For example, the reader device settings data 132 may include the settings 117 of the reader device 106A-N that were adjusted based on requests received by the management application 123. The mini-cell site configuration data 135 may include data describing current and prior configuration parameters 115 of the mini-cell sites 105A-N that are currently in or have been located in the inventory environment 103. For example, the mini-cell site configuration data 135 may include the configuration parameters 115 that were adjusted based on requests received by the management application 123.

The inventory environment data 138 may include data describing the inventory environment 103. For example, inventory environment data 138 may include detailed information about the layout of the inventory environment 103, such as the positions of zones, conveyor belts, shelves, pallets, etc., paths between mini-cell sites 105A-N and tags 109A-N, paths between reader devices 106A-N and tags 109A-N, obstacles on the paths, etc. The reader device location data 142 may include prior and current locations (e.g., Global Positioning System (GPS) coordinates) of the reader devices 106A-N in the inventory environment 103. The reader device location data 142 may indicate different locations of reader devices 106A-N over time when the reader devices 106A-N are mobile or hand-held devices. The mini-cell site location data 145 may include prior and current locations of the mini-cell sites 105A-N in the inventory environment 103. In an embodiment, the inventory environment data 138 may include the reader device location data 142 and the mini-cell site location data 145.

In an embodiment, the positions of the areas in the inventory environment 103, reader devices 106A-N, and/or tags 109A-N may be determined in various manners. For example, the positions may be determined relative to the building of the inventory environment, and may be pre-registered as inventory environment data 138. The positions may be determined using various location technologies (e.g., RSSI-based location methods, triangulation, etc.). The positions may be recorded in the inventory environment data 139 relative to a geometric grid or matrix. The positions may be defined as three-dimensional global positioning system (GPS) coordinates, geohash values, radial coordinates, etc.

The reader device capability data 148 may indicate the frequency band capabilities, security capability, hardware resources, software modules, and/or other parameters/capabilities of the reader devices 106A-N positioned within or associated with (e.g., likely to move into) the inventory environment 103. For example, the reader device capability data 148 may indicate the frequency bands/channels that a reader device 106A-N is capable of operating in, power limitations of the reader device 106A-N, etc. The mini-cell site capability data 151 may indicate the frequency band capabilities, security capabilities, and/or other capabilities of the mini-cell sites 105A-N positioned in the inventory environment 103. For example, the mini-cell site capability data 151 may indicate the frequency bands/channels that a mini-cell site 105A-N is capable of operating in, power limitations of the mini-cell sites 105A-N, etc.

The tag data 154 may include data describing the current and prior tags 109A-N positioned within the inventory environment 103. The tag data 154 may include one or more tag identifiers 157 received in response data 186 from the tags 109A-N, which may then be forwarded by the reader devices 106A-N to the controller system 120 for storage. The tag identifiers 157 may be unique to each tag 109A-N, and/or the tag identifiers 157 may be associated with a group of tags 109A-N based on various factors. For example, a group of similar items may be coupled to tags 109A-N having a common group identifier (e.g., tag identifier 157), and this group identifier may be part of the response data 186 received from the tags 109A-N. The tag data 154 may also include tag locations 160. For example, the reader devices 106A-N may forward response data 186 to the management application 123, and the management application 123 may use the response data 186 to determine the tag locations 160 of the tags 109A-N using various location determination methods (e.g., triangulation, signal strength analysis, time of arrival analysis, etc.). The management application 123 may store the tag locations 160 in the data store 129, to maintain a record of the locations of the tags 109A-N moving in, out, and within the inventory environment 103. The tag data 154 may also include tag capability data, which may indicate, for example, the frequency bands/channels in which a tag is capable of operating. For example, when a tag 109A-N is capable of operating in the 600 MHz frequency band and the 2.5 GHz frequency channel, the tag capability data may indicate that the tag 109A-N is capable of operating in the 600 MHz frequency band and the 2.5 GHz frequency channel.

Figure 2:
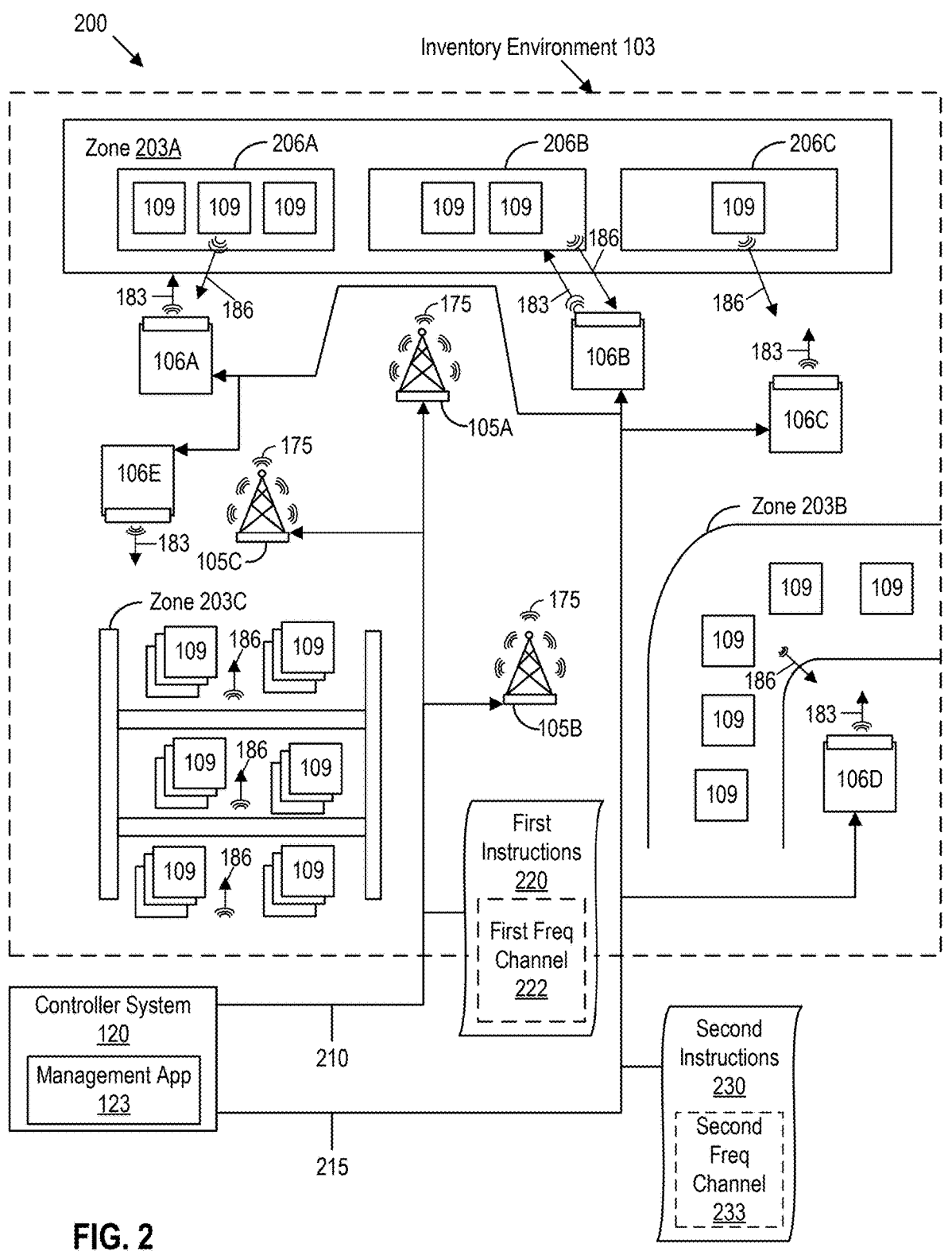
FIG. 2 is a diagram illustrating a first example of optimizing the inventory system of FIG. 1 using the mini-cell sites according to various embodiments of the disclosure.

Turning now to FIG. 2, shown is a diagram illustrating an inventory system 200 controlling the communication channels in an inventory environment 103 using mini-cell sites 105A-C according to various embodiments of the disclosure. In particular, FIG. 2 illustrates a first embodiment in which the inventory system 200 is configured based on predefined parameters.

As shown in FIG. 2, the inventory system 200 includes the controller system 120, three mini-cell sites 105A-C, five reader devices 106A-E, and multiple tags 109A-N (hereinafter referred to as "tags 109"). While the inventory system 200 only includes three mini-cell sites 105A-C and five reader devices 106A-E, it should be appreciated that this arrangement is for illustrative purposes only, and the inventory system 200 may include any number of mini-cell sites 105A-C and reader devices 106A-E, and the mini-cell sites 105A-C and reader devices 106A-E may be positioned anywhere within the inventory environment 103.

As shown in FIG. 2, the tags 109 may be positioned in various zones 203A-C, which may each correspond to different areas or regions within the inventory environment 103. For example, zone 203A may correspond to an area of the inventory environment 103 with pallets 206A-C, and each pallet 206A-C may include various items coupled to tags 109. Zone 203B may correspond to a conveyor belt in the inventory environment 103, in which items coupled to tags 109 may move along the conveyor belt in one or more directions. Zone 203C corresponds to a rack or shelf in the inventory environment 103, and items coupled to tags 109 may be stored in boxes or carts on the rack. While only three zones 203A-C are shown in FIG. 2, it should be appreciated that an inventory environment 103 may include any number of zones 203A-C.

The three mini-cell sites 105A-C are positioned at different locations in the inventory environment 103. Each of the mini-cell sites 105A-C may have different coverage areas, or areas in which the mini-cell site 105A-C may emit power signals 175 of adequate strength to provide sufficient power to tags 109 within the coverage area. For illustrative purposes, mini-cell site 105A may have a coverage area encompassing zone 203A, mini-cell site 105B may have a coverage area encompassing zone 203B, and mini-cell site 105C may have a coverage area encompassing zone 203C. In some cases, the coverage areas of the mini-cell sites 105A-C may overlap, such that tags 109 may receive adequate power from more than one mini-cell site 105A-C in the inventory environment 103.

The reader devices 106A-E may also be positioned at different locations in the inventory environment 103. While FIG. 2 shows reader devices 106A-E as being in fixed locations, it should be appreciated that reader devices 106A-E may move within the inventory environment 103, and may move in and out of the inventory environment 103. For illustrative purposes, suppose reader device 106A may be used to communicate with tags 109 positioned on pallet 206A in zone 203A, reader device 106B may be used to communicate with tags 109 positioned on pallet 206B in zone 203A, reader device 106C may be used to communicate to with tags 109 positioned on pallet 206C. Reader device 106D may be used to communicate with tags 109 positioned on the conveyor belt in zone 203B, and reader device 106E may be used to communicate with tags 109 positioned on the rack in zone 203C. However, it should be appreciated that the reader devices 106A-E may read any of the tags 109 in the inventory environment 103 at any time so long as the reader devices 106A-E are within the read range permitted for communicating with the tags 109.

Once the mini-cell sites 105A-C and the reader devices 106A-E are deployed, installed, and turned on in the inventory environment 103, and the different types of data regarding the mini-cell sites 105A-C and reader devices 106A-E are provisioned at the data store 129 of the controller system 120, the management application 123 at the controller system 120 may program the mini-cell sites 105A-C and reader devices 106A-E to communicate according to predefined parameters. For example, the predefined parameters may include predefined configuration parameters 115 for the mini-cell site 105A-C and predefined settings 117 for the reader devices 106A-N, to enable the mini-cell sites 105A-C and the reader devices 106A-E to communicate within the inventory environment 103 with little to no interference. For example, the predefined parameters may indicate a frequency band within which the mini-cell sites 105A-C and the reader devices 106A-E are to communicate with tags 109 (in this case, the management application 123 may select frequency channels within the frequency band for the mini-cell sites 105A-C and the reader devices 106A-E based on pre-loaded selection rules, logic, or code). Alternatively, the predefined parameters may explicitly indicate the frequency channel over which the mini-cell sites 105A-C are to communicate and the other frequency channel over which the reader devices 106A-E are to communicate. The predefined parameters may also indicate, for example, a predefined amount of time that the mini-cell sites 105A-C and the reader devices 106A-E are to communicate with the tags 109 over the specified frequency channels, or whether the communications should be continuous. The predefined parameters may include other adjustable configuration parameters 115 of the mini-cell sites 105A-C and settings 117 of the reader devices 106A-E (e.g., security mechanisms, access control, etc.).

In an embodiment, the predefined parameters may be pre-programmed into the controller system 120 such that when the controller system 120 is notified of installation in the inventory environment 103, the management application 123 may begin programming the mini-cell sites 105A-C and the reader devices 106A-E according to the pre-programmed parameters. Alternatively, an operator may provide the predefined parameters (e.g., from another connected device or via a user interface of the controller system 120) to the management application 123 via a request. For example, when the operator transmits a request with the predefined parameters to the management application 123, and the predefined parameters indicate only a frequency band for both communication channels, the management application 123 may select two different frequency channels within the frequency band based on the reader device capability data 148 and mini-cell site capability data 151 (e.g., indicating frequency capabilities) for the mini-cell site 105A-C communications and the reader device 106A-E communications. The two different frequencies may be within the requested frequency band, but also selected in an optimal manner to avoid interference between the two different communication channels.

The management application 123 may obtain the predefined parameters in either of the manners described above, generate first instructions 220 based on the predefined parameters, and transmit the first instructions 220 indicating a first frequency channel 222 to the mini-cell sites 105A-C at operation 210. The first instructions 220 may instruct the mini-cell sites 105A-C to set or adjust the configuration parameters 115 of the mini-cell sites 105A-C to a determined/identified first frequency channel 222. Different first instructions 220 with different first frequency channels 222 may be sent to each of the mini-cell sites 105A-C, or the same first instructions 220 with the same first frequency channel 222 may be sent to each of the mini-cell sites 105A-C. The mini-cell sites 105A-C may receive the first instructions 220 and adjust a configuration parameter 115 at the mini-cell site 105A-C to configure radio equipment at the mini-cell sites 105A-C to emit power signals 175 over the first frequency channel 222.

The first instructions 220 may also indicate a period of time or schedule over which to transmit power signals 175 over the first frequency channel 222, and may indicate other configuration parameters 115 that are to be set or adjusted at the mini-cell sites 105A-C. In this case, the mini-cell sites 105A-C may receive the first instructions 220 and ensure that the power signals 175 are emitted over the first frequency channel 222 for the period of time or according to the schedule indicated in the first instructions 220, and may adjust the other configuration parameters 115 as indicated in the first instructions 220.

The management application 123 may also generate second instructions 230 based on the predefined parameters, and transmit the second instructions 230 indicating a second frequency channel 233 to the reader devices 106A-E at operation 215. The second instructions 230 may instruct the reader devices 106A-E to set or adjust the settings 117 of the reader devices 106A-E to a determined/identified second frequency channel 233. Different second instructions 230 with different second frequency channels 233 may be sent to each of the reader devices 106A-E, or the same second instructions 230 with the same second frequency channel 233 may be sent to each of the reader devices 106A-E. The reader devices 106A-E may receive the second instructions 230 and adjust a setting 117 (e.g., network setting) at the reader device 106A-E to configure the reader devices 106A-E to communicate with the tags 109 over the second frequency channel 233 indicated in the second instructions 230.

The second instructions 230 may also indicate a period of time or schedule over which to communicate with the tags 109, and may indicate other settings 117 that are to be set or adjusted at the reader devices 106A-E. In this case, the reader devices 106A-E may receive the second instructions 230 and ensure that the all communications with the tags 109 are performed over the period of time or according to the schedule indicated in the second instructions 230, and may adjust the other settings 117 as indicated in the second instructions 230.

Figure 3:
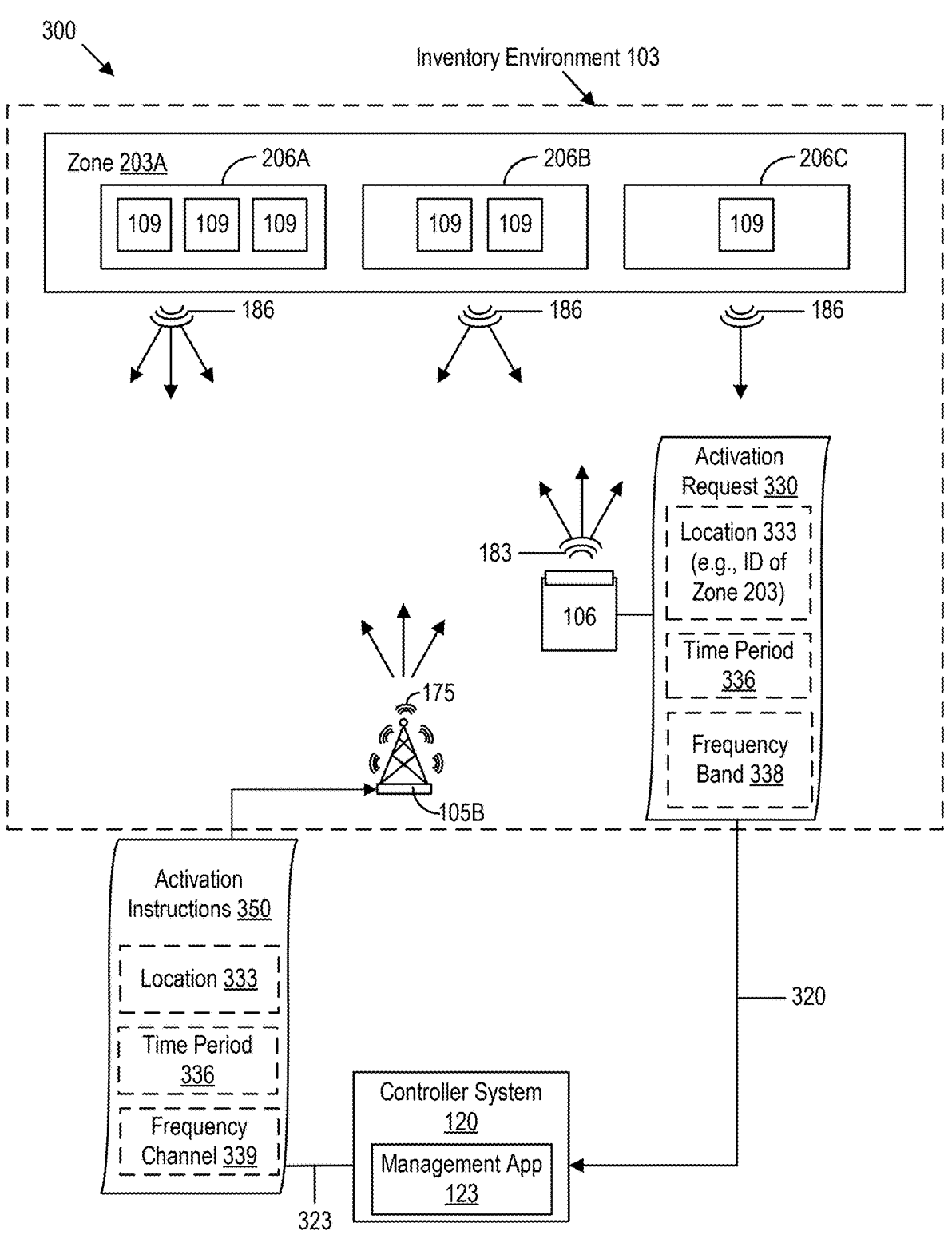
FIG. 3 is a diagram illustrating a second example of optimizing the inventory system of FIG. 1 using the mini-cell sites according to various embodiments of the disclosure.

Referring now to FIG. 3, shown is a diagram illustrating an inventory system 300 controlling the communication channels in an inventory environment 103 using mini-cell sites 105A-C (hereinafter referred to as "mini-cell sites 105") according to various embodiments of the disclosure. In particular, FIG. 3 illustrates a second embodiment in which the inventory system 300 is configured based on requests received from one or more reader devices 106A-E (hereinafter referred to as "reader devices 106") in the inventory environment 103.

The inventory system 300 shown in FIG. 3 is similar to the inventory system 200 of FIG. 2, in that the inventory system 300 includes the controller system 120 and tags 109 in zone 203A. However, for illustrative purposes, the inventory system 300 shown in FIG. 3 only includes a single reader device 106 and a single mini-cell site 105, and the inventory system 300 does not include zones 203B and 203C (or the tags 109 within). It should be appreciated that this is for illustrative purposes only, and that an inventory system 300 may include any number of reader devices 106 and mini-cell sites 105.

In this embodiment, the management application 123 at the controller system 120 may control communications between mini-cell sites 105, reader devices 106, and tags 109 based on an activation request 330 generated by a reader device 106. The activation request 330 may be a request for a mini-cell site 105 (which may currently be turned off, or on standby mode, not emitting power signals 175) to turn on and emit power signals 175, for example, in a particular direction to a zone 203A or location in the inventory environment 103.

In this embodiment, a reader device 106 may be equipped with a display and a user interface through which a user of the reader device 106 may enter request parameters (e.g., by typing or selecting via the user interface of the reader device 106), which may be included in an activation request 330. The request parameters may include, for example, a location 333 (GPS coordinates/coordinate range) in the inventory environment 103 that the user is requesting for power signals 175 to be transmitted to activate the tags 109 in the location 333. The location 333 may be an identification (e.g., value identifying) or actual (e.g., GPS coordinates/coordinate range) of the desired area for power (e.g., of the zone 203A). The request parameters may also include a time period 336 during which the user requests the mini-cell site 105 to transmit power signals 175 into the location 333 (e.g., of the zone 203A). The request parameters may also indicate a frequency band 338 (or channel) over which the power signals 175 are to be sent to the location 333 (e.g., in cases in which the mini-cell site 105 is not already programmed to transmit power signals 175 over a first frequency channel 222).

The application 116 at the reader device 106 may generate the activation request 330 including the request parameters provided by the user of the reader device 106 (e.g., the location 333, the time period 336, and frequency channel 339). At operation 320, the application 116 may transmit the activation request 330 to the management application 123 at the controller system 120. The management application 123 may identify a mini-cell site 105 that may be used to transmit power signals 175 to the location 333 based on the location 333, the time period 336, and frequency channel 339 received in the activation request 330 and the data stored in the data store 129. For example, the management application 123 may identify the mini-cell site 105 based on the request parameters and at least one of the reader device settings data 132 (e.g., indicating the current settings 117 of the reader device 106 that sent the activation request 330), the mini-cell site configuration data 135 (e.g., indicating the current configuration parameters 115 at the mini-cell sites 105), the reader device location data 142, the mini-cell site location data 145, the reader device capability data 148 (e.g., indicating frequency band capabilities of the reader device 106), mini-cell site capability data 151 (e.g., indicating frequency band capabilities of the mini-cell sites 105), and the inventory environment data 138 (e.g., indicating a path and/or obstacles along the path between the different mini-cell sites 105 and the tags 109, and between the tags 109 and the reader device 106). While FIG. 3 only shows one mini-cell site 105, it should be appreciated that the inventory environment may include many mini-cell sites 105, and the management application 123 may identify the optimal mini-cell site 105 to transmit the power signals 175 to the location 333.

After determining the optimal mini-cell site 105 for powering the tags 109 at the location 333, the management application 123 may generate activation instructions 350 based on the request parameters (e.g., the location 333, the time period 336, and frequency channel 339) received in the activation request 330. The activation instructions 350 may be instructions for the mini-cell site 105 to transmit power signals 175 for the time period 336. In some cases, the activation instructions 350 may also include the frequency channel 339 over which to transmit the power signals 175 to the location 333 (e.g., when the mini-cell site 105 is not yet programmed to transmit power signals 175 over a first frequency 222). For example, when the activation request 330 included a requested frequency band 338, the management application may determine a frequency channel 339 in the frequency band 338 based on the data in the data store 129. In some cases, the activation instructions 350 may also include the location 333 into which the user is requesting power signals 175 to be transmitted, to activate the tags 109 in the zone 203A. This may be the case when the mini-cell site 105 may be capable of directionality (e.g., transmitting the power signals 175 in a particular direction), and this capability may be indicated in the mini-cell site capability data 151 of the mini-cell site 105. In this case, the mini-cell site 105 may be capable of transmitting the power signals 175 specifically in the direction of the location 333 (e.g., without necessarily transmitting the power signals 175 in an omnidirectional manner).

At operation 323, the management application 123 may transmit the activation instructions 350 to the mini-cell site 105. The mini-cell site 105 may program the configuration parameters 115 based on the location 333, time period 336, and/or frequency channel 339 indicated in the activation instructions 350. For example, once the mini-cell site 105 has programmed the configuration parameters 115 based on the activation instructions 350, the mini-cell site 105 may begin transmitting power signals 175 for the time period 336, in some cases, over the frequency channel 339, and/or in only the direction toward the location 333.

The tags 109 in the location 333 (e.g., of the zone 203A) may receive the power signals 175, and then harvest and store energy from the power signals 175. After the management application 123 transmits the activation instructions 350 to the mini-cell site 105, the management application 123 may also transmit a notification to the reader device 106, that the tags 109 in the location 333 may be powered up within a predefined period of time. The reader device 106 may wait the predefined period of time, and then transmit interrogation signals 183 into the zone 203A. The tags 109 in the zone 203A may receive the interrogation signals 183, and transmit back response data 186 to the reader device 106. The reader device 106 may collect the response data 186 and transmit the response data 186 (in some cases, as data extracted from the response data 186) back to the controller system 120 (e.g., via the mini-cell site 105). The management application 123 at the controller system 120 may process the response data 186 (e.g., to obtain the tag location 160) and then store the response data 186 and the tag locations 160 of the tags 109 in the zone 203A in the data store 129.

During this process, the monitoring application 126 may monitor the performance of the mini-cell site 105 and the reader device 106. For example, the monitoring application 126 may examine communications between the mini-cell site 105 and the tags 109 to verify that the communications are aligned with the request parameters contained in the activation request 330. The monitoring application 126 may examine communications between the reader device 106 and the tags 109 to verify that the reader device 106 is communicating with the tags 109 in the requested location 333 for the time period 336 over the frequency channel 339.

Figure 4:
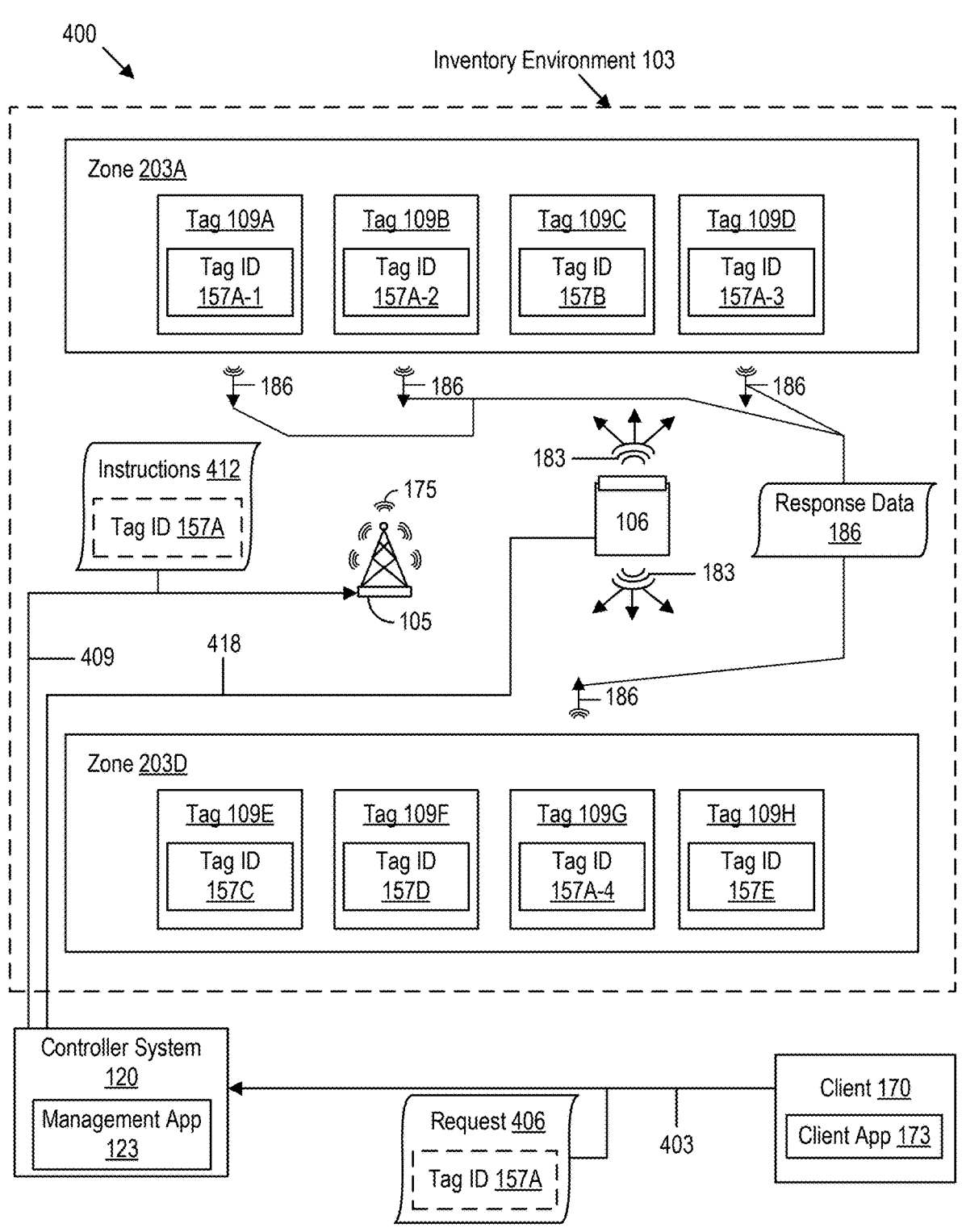
FIG. 4 is a diagram illustrating a third example of optimizing the inventory system of FIG. 1 using the mini-cell sites according to various embodiments of the disclosure.

Referring now to FIG. 4, shown is a diagram illustrating an inventory system 400 controlling the communication channels in an inventory environment 103 using mini-cell sites 105 according to various embodiments of the disclosure. In particular, FIG. 4 illustrates a third embodiment in which the inventory system 400 is configured based on requests received from one or more clients 170 in the inventory environment 103.

The inventory system 400 shown in FIG. 4 is similar to the inventory system 200 of FIG. 2 and the inventory system 300 of FIG. 3, in that the inventory system 400 includes a mini-cell site 105, a reader device 106, and tags 109A-H. However, in the inventory environment 103 shown in FIG. 4, there are two zones 203A and 203D including tags 109A-H. Zone 203A includes tag 109A-D, and zone 203D includes tags 109E-H. Each of the tags 109A-H may be provisioned with data, such as, for example, one or more tag identifiers 157A-E and information identifying the item coupled to the tag 109A-H (e.g., product type, batch number, manufacturer date, status/condition of the item, etc.). There may be different types of tag identifiers 157A-E provisioned in a tag 109A-H. For example, the tag identifiers 157A-E may include the unique identifier of the tag 109A-H (e.g., electronic product code (EPC) of the tag 109A-H (e.g., each item may have a tag 109A-H with a different tag identifier 157A-E).

In other cases, as shown in the example of FIG. 4, the tag identifier 157A-E may include a value included with multiple tags 109A-H in an inventory environment 103. In this case, the value may identify a category, type, or other aspect of the item or of the tag 109A-H. For example, different items of different types may have tags 109A-H with unique tag identifiers 157A-E (e.g., items of a first type have a tag 109A-H with a first tag identifier 157A-E, items of a second type have a tag 109A-H with a second tag identifier 157A-E, etc.). As another example, items from different manufacturers may have tags with different tag identifiers 157A-E (e.g., items from a first manufacturer may have a tag 109A-H with a first tag identifier 157A-E, items from a second manufacturer may have a tag 109A-H with a second tag identifier 157A-E, etc.). In this way, the tag identifier 157A-E provisioned at the tags 109A-H described herein may be a value uniquely identifying the tag 109A-H, or a value categorically describing an attribute of the tag 109A-H or item.

In the example shown in FIG. 4, the tag 109A has tag identifier 157A-1, tag 109B has tag identifier 157A-2, tag 109D has tag identifier 157A-3, and tag 109G has tag identifier 157A-4. In this way, the tag identifiers of the tags 109A, 109B, 109D, and 109G share a common prefix 157A, which may be a value indicative of a commonality between the items coupled to the tags 109A, 109B, 109D, and 109G. Meanwhile, tag 109C has tag identifier 157B, tag 109E has tag identifier 157C, tag 109F has tag identifier 157D, and tag 109H has tag identifier 157E. The tags 109C, 109E, 109F, and 109H may have unique tag identifiers 157B-E.

In an embodiment, a user of the client 170 may be equipped with the client application 173, a display, and a user interface through which the user may enter client parameters requesting the controller system 120 to instruct performance of an operation using the mini-cell sites 105 and reader devices 106 in the inventory system 400. For example, the operation may be for the controller system 120 to instruct the mini-cell sites 105 and reader devices 106 to find a missing item (with a tag 109A-H), to reduce energy usage across the entire inventory environment 103, programmatically change the state (e.g., powered off, powered on and on standby, powered on and actively emitting, etc.) of various mini-cell sites 105 in the inventory environment 103, etc.

In an embodiment, the user of the client 170 may enter the client request parameters (e.g., by typing or selecting via the user interface of the client 170). The client request parameters may include data associated with the performance of the requested operation. For example, when the request is to find a missing item, the user of the client 170 may enter the common prefix of the tag identifier '157A' (included in tags 157A-1, 157A-2, 157-3, and 157A-3 of tags 109A, 109B, 109D, and 109G, respectively), one of which may be coupled to the missing item (e.g., such that the request parameter includes the tag identifier prefix 157A). When the request is to reduce energy usage at the inventory environment 103, the user may enter a schedule indicating timings to power cycle (e.g., turning on and off) the mini-cell sites 105 (e.g., such that the request parameter includes the schedule). When the request is to programmatically change the state of the mini-cell sites 105, the user may enter rules or conditions governing when to change the state of a mini-cell site 105 to another state (e.g., such that the request parameters include the rules or conditions).

The client application 173 may generate a request 406 to perform an operation in the inventory environment 103, in which the request includes the request parameters. For example, as shown in FIG. 4, when the request 406 is to locate a missing item, the request 406 may indicate that the operation is to identify a missing item and the request 406 may include the common tag identifier prefix 157A of the tag 109A-H positioned on the missing item. The request 406 may also include data associated with one or more items coupled to the tags 109A-H. At operation 403, the client 170 may transmit the request 406 to the controller system 120.

The management application 123 at the controller system 120 may determine adjustments to configuration parameters 115 at one or more mini-cell sites 105 and/or adjustments to settings 117 at one or more reader devices 106 based on the request parameters in the request 406. For example, in the example shown in FIG. 4, the adjustments may be to the settings 117 of one or more reader devices 106 in the inventory environment 103, in which the adjustment to the settings 117 may be to configure the reader devices 106 to only read tags 109A, 109B, 109D, and 109G having the tag identifier prefix 157A indicated in the request 406. For example, the settings 117 may be adjusted such that the reader device 106 may be programmed to transmit interrogation signals 183 including the tag identifier prefix 157A, such that only tags 109A, 109B, 109D, and 109G having the common tag identifier prefix 157A respond with response data 186.

When the request 406 is for reducing energy usage/power cycling, the determined adjustments may be for the configuration parameters 115 at the mini-cell sites 105 to change the schedule or rules regarding when to power mini-cell sites 105 on and off. When the request 406 is for programmatic state changes, the determined adjustments may be for the configuration parameters 115 at the mini-cell sites 105 to change the schedule or rules regarding when to change the state of mini-cell sites 105 to active and transmitting power signals 175 or standby and not transmitting power signals 175.

The management application 123 may then generate instructions 412 for the mini-cell sites 105 and/or the reader devices 106 based on the request parameters in the request 406, and at operation 409, transmit the instructions 412 to the mini-cell sites 105 and/or reader devices 106. In the example shown in FIG. 4, the management application 123 may transmit the instructions 412 to the mini-cell site 105. The instructions 412 may include the request parameters received in the request 406. In the example shown in FIG. 4, the instructions 412 include other instructions (e.g., code, logic, conditions, etc.) related to the requested operation to the tags with common tag ID prefix 157A.

The mini-cell site 105 may receive and execute the instructions 412 by programming logic into the mini-cell site 105 based on the request parameters (e.g., to look for the tags 109A, 109B, 109D, and 109G having the tag identifier prefix 157A). The mini-cell site 105 may then begin transmitting interrogation signals 183, which in one embodiment may include the tag identifier prefix 157A, instructing only the tags 109A, 109B, 109D, and 109G to respond with response data 186. As shown in the example of FIG. 4, only the tags 109A, 109B, 109D, and 109G transmit response data 186 back to the reader device 106, in which the response data 186 may include the tag identifier prefix 157A.

In an embodiment, the reader device 106 may transmit the response data 186 back to the management application 123 at the control system 120 at operation 418. The management application 123 may use the response data 186 to identify whether one of the tags 109A, 109B, 109D, and 109G is coupled to the missing device (e.g., the response data 186 may include additional data that verifies the item as the missing item). The management application 123 may also update the tag data 154 with the tag locations 160 of each of the tags 109A, 109B, 109D, and 109G. The control system 120 may also transmit an indication of whether the missing item was found, in some cases, with the response data 186 and the tag locations 160, to the client 170.

Figure 7:
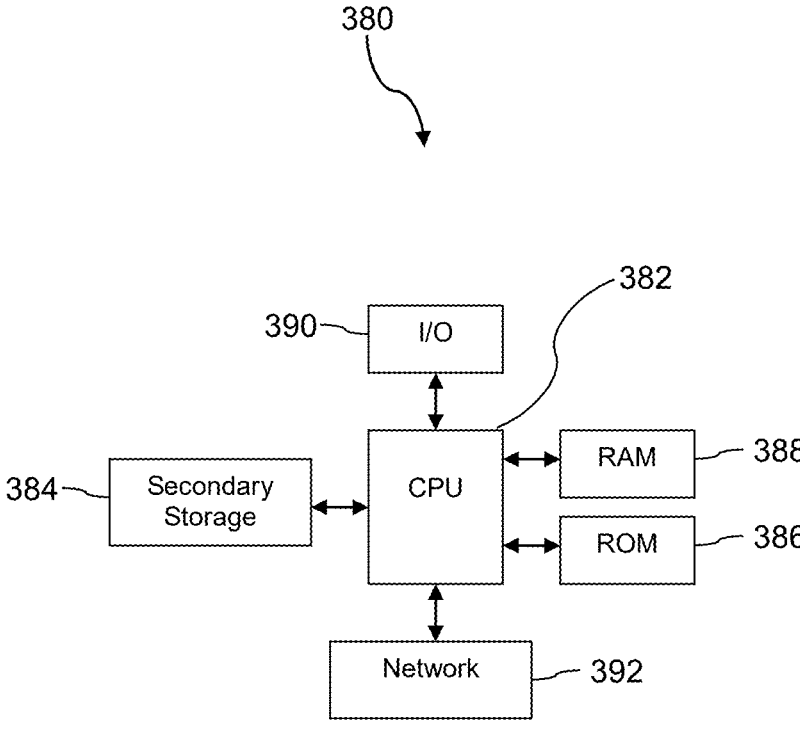
FIG. 7 is a block diagram of a computer system implemented within the communication system of FIG. 1 according to an embodiment of the disclosure.

Referring now to FIG. 5, shown is a method 500 for optimizing performance of an inventory system using one or more mini-cell sites 105 positioned throughout an inventory environment 103. Method 500 may be implemented by an inventory system (e.g., the inventory system 200, 300, or 400). In embodiments, the method 500 may be implemented using a computer system with components as shown in FIG. 7. As illustrated, method 500 of FIG. 5 includes a number of enumerated operations, but embodiments of the operations in FIG. 5 may include additional operations before, after, and in between the enumerated operations. In some embodiments, one or more of the enumerated operations may be omitted or performed in a different order.

At step 503, method 500 comprises maintaining, in a data store 129 of a controller system 120 in the inventory system, inventory environment data 138 and tag data 154. The inventory environment data 138 includes data describing a position of the one or more mini-cell sites 105 and one or more reader devices 106 in an inventory environment 103. In an embodiment, the tag data 154 includes a tag identifier 157 of one or more tags 109. The inventory system includes the controller system 120, one or more mini-cell sites 105, reader devices 106, and tags 109.

At step 505, method 500 comprises receiving, by a management application 123 at the controller system 120 from a client application 173 executing at a client 170, a request 406 to identify and locate the one or more tags 109 in the inventory environment 103 that are associated with the tag identifier 157. At step 507, method 500 comprises determining, by the management application 123, a setting 117 for the one or more reader devices 106 in the inventory environment 103 based on the request 406. The setting 117 configures the one or more reader devices 106 to only receive response data 186 from the one or more tags 109 in the inventory environment 103 that are associated with the tag identifier 157.

At step 509, method 500 comprises transmitting, by the management application 123 to the one or more reader devices 106, an instruction 412 to set the setting 117 at the one or more reader devices 106 to only read the one or more tags in the inventory environment that are associated with the tag identifier over a frequency channel, wherein, based on the instruction, the one or more reader devices to transmit interrogation signals 183 including the tag identifier 157 over a frequency channel to only receive response data 186 from the one or more tags 109 in the inventory environment that are associated with the tag identifier 157. At step 511, method 500 comprises receiving, by the management application 123, the response data 186 from the one or more tags 109 that are associated with the tag identifier 157.

Method 500 may further comprise additional attributes and/or steps not explicitly shown in FIG. 5. In an embodiment, the tag identifier 157 may identify a plurality of tags 109, the plurality of tags 109 are respectively coupled to a plurality of items, and the plurality of items are associated with a common category of items. In an embodiment, the tag identifier 157 may uniquely identify a single tag 109, and the tag 109 is indicated in the request 406 as being coupled to a missing item. The request 406 comprises the tag identifier 157 and data associated with one or more items coupled to the one or more tags 109. The request 406 indicates the frequency channel over which the reader device 106 is to communicate with the one or more tags 109.

In an embodiment, method 500 may further comprise identifying, by the management application 123, a tag location 160 for each of the one or more tags 109 that are associated with the tag identifier 157 based on the response data 186 received from the one or more tags 109 that are associated with the tag identifier 157. In an embodiment, method 500 may further comprise receiving, by the management application 123 from the client application 173, a second request to reduce energy usage in the inventory system, determining, by the management application 123, a configuration parameter 115 for the one or more mini-cell sites 105 in the inventory environment 103 based on the request, in which the configuration parameter 115 configures the one or more mini-cell sites 105 to perform power cycling according to a predefined schedule, and transmitting, by the management application 123 to the one or more mini-cell sites 105, a second instruction to set the configuration parameter 115 at the one or more mini-cell sites 105 to perform power cycling according to the predefined schedule.

Referring now to FIG. 6, shown is a method 600 for optimizing performance of an inventory system using one or more mini-cell sites 105 positioned throughout an inventory environment 103. Method 600 may be implemented by an inventory system (e.g., the inventory system 200, 300, or 400). In embodiments, the method 600 may be implemented using a computer system with components as shown in FIG. 7. As illustrated, method 600 of FIG. 6 includes a number of enumerated operations, but embodiments of the operations in FIG. 6 may include additional operations before, after, and in between the enumerated operations. In some embodiments, one or more of the enumerated operations may be omitted or performed in a different order.

At step 603, method 600 comprises maintaining, in a data store 129 of a controller system 120 in the inventory system, inventory environment data 138, reader device capability data 148, and mini-cell site capability data 151. The inventory environment data includes data describing a layout of the inventory environment 103, the reader device capability data 148 indicates capabilities of one or more reader devices 106 in the inventory environment 103, and the mini-cell site capability data 151 indicates capabilities of the one or more mini-cell sites 105 in the inventory environment 103.

At step 605, method 600 comprises receiving, by a management application 123 at the controller system 120 from a reader device 106 of the one or more reader devices 106, an activation request 330 to provide power to one or more tags 109 in a zone 203A-D (hereinafter referred to as "zone 203") of the inventory environment 103 for a predefined time period 336 over a frequency band. At step 607, method 600 comprises determining, by the management application 123, a mini-cell site 105 of the one or more mini-cell sites 105 to power the one or more tags 109 in the zone 203 and a frequency channel 339 in the frequency band over which to transmit power signals 175 to the one or more tags 109 in the zone 203.

At step 609, method 600 comprises transmitting, by the management application 123 to the mini-cell site 105, activation instructions 350 comprising the time period 336 and the frequency channel 339, to set one or more configuration parameters 115 of the mini-cell site 105 based on the time period 336 and the frequency channel 339. At step 611, method 600 comprises transmitting, by the mini-cell site 105, the power signals 175 in a direction of the one or more tags 109 in the zone 203 for the time period 336 over the frequency channel 339 to activate the one or more tags 109 in the zone 203. At step 615, method 600 comprises, after the one or more tags 109 have received the power signals 175, transmitting, by the reader device 106, interrogation signals 183 to the one or more tags 109 and receiving response data 186 from the one or more tags 109.

Method 600 may further comprise additional attributes and/or steps not explicitly shown in FIG. 6. In an embodiment, the inventory environment data 138 comprises a location of the one or more mini-cell sites 105 in the inventory environment 103, or a location of the one or more reader devices 106 in the inventory environment 103. In an embodiment, the reader device capability data 148 indicates frequencies over which the one or more reader devices 106 are capable of communicating, and the mini-cell site capability data 151 indicates frequencies over which the one or more mini-cell sites 105 are capable of communicating.

In an embodiment, the activation request 330 comprises an identification of the zone 203, the time period 336, and the frequency band 338 for transmitting the power signals 175 to the one or more tags 109 in the zone 203. In an embodiment, when the frequency channel 339 is 2.5 gigahertz (2.5 GHZ), the one or more tags 109 are configured to communicate over a 2.5 GHz frequency channel, and/or over a frequency channel of the reader device 106.

In an embodiment, the interrogation signals 183 comprise only data signals, and the one or more tags 109 do not obtain power from the interrogation signals 183. In an embodiment, method 600 further comprises monitoring, by a monitoring application 126 at the controller system 120, signals emitted by the mini-cell site 105 to verify that the mini-cell site 105 is complying with the activation instructions 412.

FIG. 7 illustrates a computer system 700 suitable for implementing one or more embodiments disclosed herein. In an embodiment, the controller system 120, client 170, mini-cell sites 105, and/or reader devices 106, etc., may each be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for optimizing performance of an inventory system using one or more mini-cell sites comprising radio equipment configured to broadcast power signals within an inventory environment positioned throughout the inventory environment, the method comprising:

maintaining, in a data store of a controller system in the inventory system, inventory environment data, reader device capability data, and mini-cell site capability data, wherein the inventory environment data includes data describing a layout of the inventory environment, wherein the reader device capability data indicates capabilities of one or more reader devices in the inventory environment, and wherein the mini-cell site capability data indicates capabilities of the one or more mini-cell sites in the inventory environment;

receiving, by a management application at the controller system from a reader device of the one or more reader devices, an activation request to provide power to one or more tags in a zone of the inventory environment for a time period over a frequency band;

determining, by the management application, a mini-cell site of the one or more mini-cell sites to power the one or more tags in the zone and a frequency channel in the frequency band over which to transmit power signals to the one or more tags in the zone;

transmitting, by the management application to the mini-cell site, activation instructions comprising the time period and the frequency channel, to set one or more configuration parameters of the mini-cell site based on the time period and the frequency channel;

transmitting, by the mini-cell site, the power signals in a direction of the one or more tags in the zone for the time period over the frequency channel to activate the one or more tags in the zone; and after the one or more tags have received the power signals, transmitting, by the reader device, interrogation signals to the one or more tags and receiving response data from the one or more tags.

2. The method of claim 1, wherein the inventory environment data comprises a location of the one or more mini-cell sites in the inventory environment, or a location of the one or more reader devices in the inventory environment.

3. The method of claim 1, wherein the reader device capability data indicates frequencies over which the one or more reader devices are capable of communicating, and wherein the mini-cell site capability data indicates frequencies over which the one or more mini-cell sites are capable of communicating.

4. The method of claim 1, wherein the activation request comprises an identification of the zone, the time period, and the frequency channel for transmitting the power signals to the one or more tags in the zone.

5. The method of claim 1, wherein the one or more tags are configured to communicate over a frequency channel of the one or more reader devices.

6. The method of claim 1, wherein the interrogation signals comprise only data signals, and wherein the one or more tags do not obtain power from the interrogation signals.

7. The method of claim 1, further comprising monitoring, by a monitoring application at the controller system, signals emitted by the mini-cell site to verify that the mini-cell site is complying with the activation instructions.

8. A method implemented in an inventory environment, the method comprising:

maintaining, in a data store of a controller system in the inventory system, inventory environment data and tag data, wherein the inventory environment data includes data describing a position of one more mini-cell sites and one or more reader devices in the inventory environment, wherein the one or more mini-cell sites comprise radio equipment configured to broadcast power signals within the inventory environment, and wherein the tag data includes a tag identifier of one or more tags;

receiving, by a management application at the controller system from a client application executing at a client, a request to identify and locate the one or more tags in the inventory environment that are associated with the tag identifier;

determining, by the management application, a setting for the one or more reader devices in the inventory environment based on the request, wherein the setting configures the one or more reader devices to only receive response data from the one or more tags in the inventory environment that are associated with the tag identifier;

transmitting, by the management application to the one or more reader devices, an instruction to set the setting at the one or more reader devices to transmit interrogation signals including the tag identifier over a frequency channel such that the one or more reader devices only receive response data from the one or more tags in the inventory environment that are associated with the tag identifier; and receiving, by the management application, the response data from the one or more tags that are associated with the tag identifier.

9. The method of claim 8, wherein the tag identifier identifies a plurality of tags, wherein the plurality of tags are respectively coupled to a plurality of items, and wherein the plurality of items are associated with a common category of items.

10. The method of claim 8, wherein the tag identifier uniquely identifies a single tag, wherein the tag is indicated in the request as being coupled to a missing item.

11. The method of claim 8, wherein the request comprises the tag identifier and data associated with one or more items coupled to the one or more tags.

12. The method of claim 8, wherein the request indicates the frequency channel over which the one or more reader devices is to communicate with the one or more tags.

13. The method of claim 8, further comprising identifying, by the management application, a tag location for each of the one or more tags that are associated with the tag identifier based on the response data received from the one or more tags that are associated with the tag identifier.

14. The method of claim 8, further comprising:

receiving, by the management application from the client application, a second request to reduce energy usage in the inventory system;

determining, by the management application, a configuration parameter for the one or more mini-cell sites in the inventory environment based on the request, wherein the configuration parameter configures the one or more mini-cell sites to power cycle according to a predefined schedule; and transmitting, by the management application to the one or more mini-cell sites, a second instruction to set the configuration parameter at the one or more mini-cell sites to power cycle according to the predefined schedule.

15. An inventory system, comprising:

a mini-cell site comprising radio equipment configured to broadcast power signals within an inventory environment; and a reader device configured to communicate with one or more tags in the inventory environment;

a control system, comprising:

a memory configured to store mini-cell site capability data, reader device capability data, and inventory environment data;

a management application stored at the memory, which when executed by a processor, causes the management application to be configured to:

transmit a first instruction to the mini-cell site to set a configuration parameter at the mini-cell site to a first frequency channel based on the mini-cell site capability data and the inventory environment data; and transmit a second instruction to the reader device to set a network setting at the reader device to a second frequency channel based on the reader device capability data and the inventory environment data, wherein the first frequency channel is different from the second frequency channel.

16. The inventory system of claim 15, wherein after the mini-cell site receives the first instruction, the mini-cell site is configured to set the configuration parameter to the first frequency channel to transmit power signals to the one or more tags over the first frequency channel, and wherein after the reader device receives the second instruction, the reader device is configured to set the network setting to the second frequency channel to transmit interrogation signals to the one or more tags over the second frequency channel.

17. The inventory system of claim 15, wherein the configuration parameter is associated with an operating frequency channel of the radio equipment at the mini-cell site, and wherein the network setting is associated with an operating frequency channel of the reader device.

18. The inventory system of claim 15, wherein the network setting comprises at least one of a power output of a signal emitted by the reader device, a frequency band or channel at which the reader device operates, or a receiver sensitivity of the reader device.

19. The inventory system of claim 15, wherein the mini-cell site capability data comprises a frequency band in which the mini-cell site is capable of operating, and wherein the reader device capability data comprises the frequency band in which the reader device is capable of operating, and wherein the frequency band comprises the first frequency channel and the second frequency channel.

20. The inventory system of claim 15, wherein the inventory environment data indicates a layout of the inventory environment, including a location of the mini-cell site and the reader device.

* * * * *